United States Patent [19]
MacKellar

[11] 3,986,161
[45] Oct. 12, 1976

[54] UNDERWATER DIRECTIONAL GUIDANCE APPARATUS

[75] Inventor: John A. MacKellar, Portland, Oreg.

[73] Assignee: Sea-Scan, Inc., Portland, Oreg.

[22] Filed: Apr. 7, 1975

[21] Appl. No.: 565,367

[52] U.S. Cl. ................................................ 340/6 R
[51] Int. Cl.$^2$ .......................................... G01S 3/80
[58] Field of Search ............. 340/3 R, 5 R, 6 R, 8.5; 335/205, 206, 207

[56] References Cited
UNITED STATES PATENTS

| | | | |
|---|---|---|---|
| 3,005,183 | 10/1961 | Mayes | 340/6 R |
| 3,267,414 | 8/1966 | Kritz | 340/3 R |
| 3,505,638 | 4/1970 | Watson | 340/6 R |
| 3,735,298 | 5/1973 | Colby | 335/206 |
| 3,784,805 | 1/1974 | Rolle | 340/3 R |

*Primary Examiner*—Richard A. Farley
*Attorney, Agent, or Firm*—Kolisch, Hartwell, Dickinson & Stuart

[57] ABSTRACT

Ultrasonic directional guidance apparatus for use by divers underwater includes a pair of compact, self-contained units — a pinger for generating omnidirectional signal bursts, and a unidirectionally sensitive hydrophone for use in locating the pinger. For economy of manufacture, the units ae structurally similar and have substantially identical watertight housings. A significant feature shared by the units is an easily operated switching arrangement for turning the units off and on, or for changing operating modes, i.e., hydrophone sensitivity or pinger signal transmission rate. The disclosed switching arrangement includes a collar carrying a magnet and mounted on the housing for rotation relative to it. Magnetic field-actuated switches inside the housing are selectively actuated to energize the units or change operating modes by rotating the collar to different detented positions, one for each switch, in which the magnet is sufficiently close for its field to actuate the switch.

15 Claims, 7 Drawing Figures

UNDERWATER DIRECTIONAL GUIDANCE APPARATUS

BACKGROUND AND SUMMARY OF THE INVENTION

The present invention relates generally to underwater communication equipment, and more particularly to self-contained ultrasonic directional guidance apparatus for use by divers underwater.

Scuba-equipped divers often have a need to find their way back to an anchored surface craft, to relocate an earlier-discovered submerged object, to keep track of a companion diver, or otherwise to navigate underwater. Poor underwater visibility frequently makes visual navigation impossible, and a diver must then rely on his compass or come to the surface for bearings. As those with experience in this field will appreciate, such direction-finding methods have a number of disadvantages, particularly on deep dives or when above-water visibility is impaired.

In recognition of the problems experienced by divers in navigating underwater, various ultrasonic homing or tracking devices have been described in the prior art. None has experienced any appreciable commercial success, however, and this is attributed to the one or more drawbacks which each includes — excessive complexity and consequent high cost, bulkiness, low reliability, or operating inconvenience. Accordingly, a general object of the present invention is to provide improved underwater directional guidance apparatus without the drawbacks of prior art apparatus.

A more specific object of the invention is to provide a diver guidance system in the form of compact, portable, self-contained units — an impulse source or pinger capable of generating omnidirectional ultrasonic signals, and an impluse receiver or hydrophone capable of highly directional reception of signals generated by a pinger.

Another object of the present invention is to provide underwater signaling apparatus having multiple operating modes, — different power or sensitivity levels, for example — which can be easily and conveniently set or changed by a diver underwater.

A further object of the invention is to provide a directional hydrophone which indicates the reception of signals from a pinger by displaying related light signals for viewing by a diver.

A still further object of the invention is to provide a compact, inexpensively manufactured watertight housing structure for apparatus of the described type, and, more particularly, a structure having simple, reliable and easily operated switching means for controlling the operating modes of the apparatus.

The novel features characteristic of the present invention are set forth with particularity in the appended claims. However, the apparatus of the invention itself, both as to its construction and method of operation, will best be understood by reference to the following detailed description of a preferred embodiment read in conjunction with accompanying drawings.

DESCRIPTION OF PREFERRED EMBODIMENT

Briefly, the underwater guidance apparatus which is the subject of the present invention includes a pair of self-contained units — an ultrasonic impulse source, or pinger, and an impulse receiver, or hydrophone. The units are substantially similar structurally, and for that reason, the invention will be described principally with reference to the construction of a hydrophone unit. It will be understood, however, that with the exception of the differences detailed below, the description is equally applicable to the construction of a pinger unit.

Figure 1:
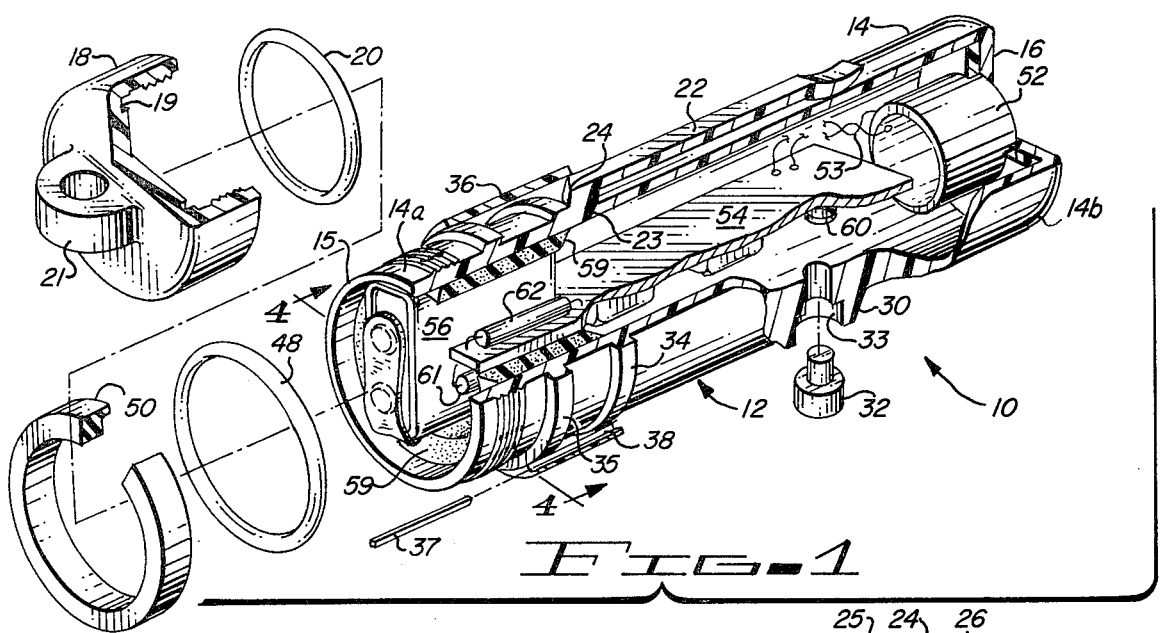
FIG. 1 is an exploded, perspective view, partly cut away to illustrate constructional details, of a directional hydrophone unit according to the invention.

Referring now to the drawings, and first to FIg. 1 thereof, a directional hydrophone constructed according to the invention is indicated generally at 10. Hydrophone 10 includes a generally cylindrical watertight housing 12 similar in configuration to an ordinary flashlight, and of a size small enough to be held in one hand by a diver. By way of illustration, the hydrophone shown in the drawing has an overall length of about 7 inch and a body diameter of about 1½ inch. Housing 12 includes an elongate tubular body 14 having an externally threaded open end 14a with an annular end surface 15, and a closed end 14b formed by an integral end wall 16. End 14b is also referred to herein as the front or forward end of the hydrophone body. Similarly, end 14a is also referred to as the rear end of the body.

Housing 12 additionally includes a threaded cap 18 having an annular groove 19 in its inner face accommodating an elastomer O-ring 20. Cap 18 screws onto open end 14a, with O-ring 20 resiliently engaging end surface 15 to provide a watertight seal between the cap and body 14. An apertured ear 21 on cap 18 provides means for attaching a line or other securing means to the housing.

Figure 3:
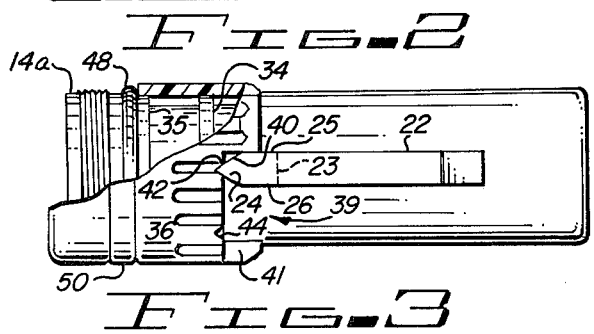
FIG. 3 is a reduced scale side elevation, partly cut away, showing the opposite side of the FIG. 2 hydrophone.
Figure 4:
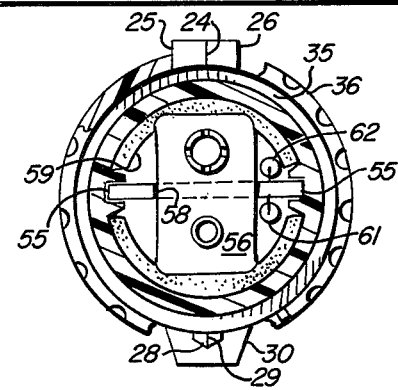
FIG. 4 is a partly sectional view taken along line 41—4 in FIG. 1 looking at the open end of the hydrophone housing.

Referring now to FIGS. 3 and 4 along with FIG. 1, housing 12 includes an elongate, longitudinally extending belt clip 22 integrally joined by clip head 23 to the exterior of the body 14 at the location shown. One end of clip head 23, the left end in FIGs. 1 and 3, is formed into a point 24 directed axially of the body toward rear end 14a. The sides of head 23 provide a pair of flat, spaced-apart surfaces 25, 26 projecting outward from the side of body 14. The functions of point 24 and surfaces 25, 26, will be described below.

Figure 2:
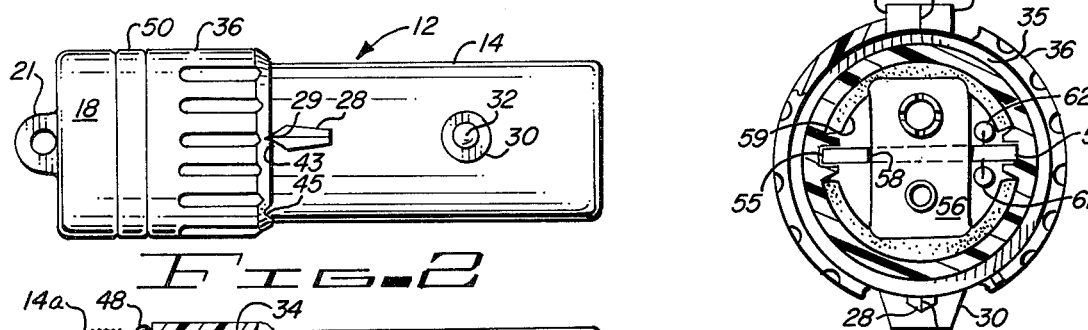
FIG. 2 is a reduced scale side elevation showing one side of an assembled hydrophone.

Referring briefly to FIGS. 2 and 4, a direction-indicating boss, or guide, 28 is integrally joined to the exterior of body 14 at the location shown, diametrically opposite belt clip 22. One end of guide 28, the left end in FIG. 2, is formed into a point 29 directed toward the body's rear end 14a. Disposed axially forward of guide 28, toward the front end of housing 12, is an integral annular boss 30 accommodating a transparent lens 32 in a stepped bore 33 extending through boss 30 and the side of body 14. Lens 32 is sealed in the bore in a suitable manner to maintain the enclosure watertight.

Again referring to FIGS. 1, 3 and 4, a pair of outwardly projecting, circumferential ribs 34, 35 are integrally joined to body 14 at spaced-apart locations in the region intermediate end 14a and points 24, 29. Ribs 34, 35 suitably have a rectangular cross section, as shown in FIG. 1. Coaxially received on housing 12 and supported on ribs 34, 35 for rotation relative to the housing is a knurled collar 36 mounting an elongate permanent magnet 37 in an axially extending recess 38 therein. As best shown in FIG. 3, the forward-facing edge of collar 36 includes a stepped or cut-back region 39 providing a pair of shoulders 40, 41 in the collar. Shoulders 40, 41 limit rotation of collar 36 relative to housing 12 through engagement of one of the shoulders with a corresponding one of clip head surfaces 25, 26. Thus, rotation of the collar in one direction is limited or stopped by engagement of shoulder 40 with surface 25, as is shown in FIGS. 3 and 4, and rotation in the opposite direction is limited by engagement of shoulder 41 with surface 26. Surfaces 25, 26 and shoulders 40, 41 are also referred to herein as stop means for the collar.

Figure 5:
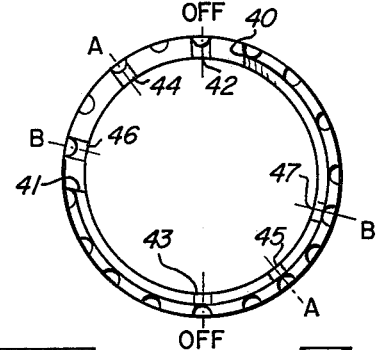
FIG. 5 is an opposite end view of the knurled collar shown in the FIG. 4 view, illustrating detent notch locations in the collar.

Now referring to FIGS. 1–5, collar 36 includes three angularly spaced-apart pairs of notches in its forward edge for engaging points 24, 29 and thereby releasably holding the collar in any one of three different rotational positions relative to housing 12. Referring particularly to FIG. 5, notches 42, 43 are provided for holding collar 26 at an "OFF" position wherein point 24 is received in notch 42 and point 29 is received in notch 43. Hydrophone 10 is shown in FIGS. 1–4 with collar 36 in the OFF position. Similarly, notches 44, 45 are provided for holding the collar in an A position, and notches 46, 47 for holding the collar in a B position. The significance of the designated positions will be explained later on.

Collar 36 is yieldably biased against points 24, 49 by an elastomer O-ring 48 carried by a pressure ring 50 removably mounted on the open end of body 14 between cap 18 and collar 36. In the assembled hydrophone, the forward end of cap 18 presses against the rear end of ring 50, forcing O-ring 48 against the rear end of collar 36. As will be understood, the pressure applied against collar 36 through O-ring 48 provides a detenting action between points 24, 29 and the different pairs of notches, preventing accidental or inadvertent rotation of the collar. Points 24, 29 and notches 42–47 are also referred to herein as cooperating detent means.

For reasons which will become apparent, body 14 is fabricated of a non-magnetic material, suitably a plastic material. For low cost production, body 14 preferably is molded in one piece from a suitable plastic such as ABS or polycarbonate. Cap 18, collar 36 and pressure ring 50 are molded of the same material.

Referring to FIGS. 1 and 4, an ultrasonic transducer 52, a circuit board 54, and a battery 56 are mounted within hydrophone body 14. Transducer 52 is a commercially available "thickness mode poled" device of a ceramic transducing material such as barium titanate, formed into a thin-walled, hollow cylinder of a suitable size. The physical dimensions of the transducer are related to its operational frequency range in a manner well understood by those skilled in the relevant art. In hydrophone 10, transducer 52 has a height and diameter of about 0.75 inch and a wall thickness of about 0.1 inch. One end of the transducer 52 is cemented to the inner face of end wall 15 using a potting compound having approximately the acoustic impedance of water. Suitable potting compounds are well known and commercially available from the suppliers of ultrasonic transducer elements. Leads 43 connect the transducer to electrical circuitry on circuit board 54.

Circuit board 54 is removably held in position in body 14 by a pair of opposed integral edge guide channels 55 (FIG. 4) extending axially along the interior wall of body 14. The channels, which are sized to provide a snug fit for board 54, terminate a suitable distance rearwardly of end wall 16 to prevent the board from contacting transducer 52. A rectangular notch 58 formed in the rear end of circuit board 54 accommodates battery 56 as shown. Semicircular strips 59 of a resilient plastic foam or other suitable spongy material are adhered to the interior surfaces of body 14 in the region surrounding the battery and hold it in position.

As indicated above, hydrophone 10 includes electrical circuitry on circuit board 54 for processing electrical signals produced by the transducer. The circuitry is not shown in detail, since it comprises conventional prior art electronic circuits and does not form part of the present invention. It will be understood, however, that the circuitry on board 54 includes means for amplifying electrical signals from the transducer and for thereafter displaying them in a diver-perceptible form. According to the preferred embodiment being described, such display means comprise a light-emitting semiconductor device, suitably a light-emitting diode or LED 60. The signal processing circuitry includes an amplifier to the input of which transducer 52 is connected, a lamp driver for activating the LED, and a low pass filter interconnecting the output of the amplifier and the input of the lamp driver. LED 60 and other components comprising the electrical circuitry are mounted in a known manner on circuit board 54. As shown in FIG. 1, LED 60 is located on the board so that it is adjacent and substantially in alignment with bore 33 when the board is in position in body 14.

Also included in the electrical circuitry of hydrophone 10 are a pair of reed switches 61, 62 for controlling the operational modes of the hydrophone in a manner which will be described. As will be understood, switches 61, 62 are conventional magnetic field-actuated switches having contacts adapted to close when they are subjected to a predetermined magnetic field. The magnetic field in this case is provided by magnet 27 in collar 36. The switches are mounted generally opposite each other on different sides of circuit board 54, adjacent one side of battery 56, and oriented axially of body 14 as shown in FIGS. 1 and 4. The mounting position of switches 61, 62 is such that switch 61 is actuated by magnet 37 when collar 36 is rotated to its A position, and switch 62 is actuated when the collar is rotated to its B position. In the collar's OFF position, neither switch is actuated.

For reasons which will be explained later on, hydrophone 10 is provided with two operating modes — one providing high, and the other low, signal receiving sensitivity. Thus, referring to FIGS. 4 and 5, hydrophone 10 is turned on and the desired operating mode selected by rotating collar 36 relative to the body 14. With collar 36 in the OFF position shown in FIG. 4, i.e., with the collar rotated to its clockwise limit, magnet 37 is spaced a sufficient distance from both of switches 60, 61 to preclude actuation of either. By rotating collar 36 counterclockwise to detent position A, magnet 37 is carried to a position for the magnet which is radially outward of switch 60. In that position magnet 37 is sufficiently close for its field to actuate or close the switch, turning on the hydrophone and establishing a low sensitivity mode of operation. In a similar manner, rotating the collar to its counterclockwise limit position B, the magnet is carried to a position radially outward of switch 61, closing the switch and providing a high sensitivity operating mode for the hydrophone. As will be understood, the switches are angularly spaced apart a sufficient distance so that switch 61 is not activated when collar 36 is turned to position A, and switch 60 is likewise not activated when the collar is at position B.

The pinger unit of the invention is structurally similar to just-described hydrophone 10, the main difference being the electrical circuitry employed to accomplish its function — generating ultrasonic impulses in the form of repetitive bursts of ultrasonic acoustical energy. As was true of the hydrophone, the electrical circuitry comprises conventional prior art circuits and thus are not shown. By way of example, however, a pinger suitably may include a free-running multivibrator having a repetition rate of about 0.2 to 3 Hz. The multivibrator controls, i.e., switches on and off, a 50–100 kHz oscillator, producing pulses or bursts of ultrasonic electrical energy which are amplified and coupled to a transducer for conversion to acoustical energy.

Figure 6:
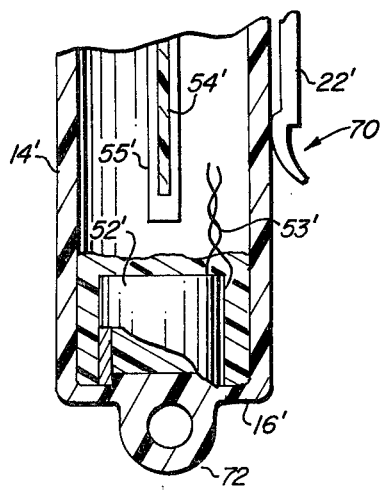
FIG. 6 is a simplified, partly sectional view of a portion of a pinger unit.

Referring now to FIG. 6, a portion of a pinger 70 is shown therein in simplified form to illustrate the physical differences between a pinger and the previously described hydrophone unit. Elements of pinger 70 which are similar to those of hydrophone 10 are indicated by primed numbers. It will be noted that pinger housing 12' includes an additional apertured mounting ear 72 extending outward from the outer face of end wall 16', thus providing attaching means on either end of the housing. The pinger body includes neither the lens nor the lens-accommodating means of the hydrophone body, however.

Transducer 52' is of the same type as transducer 52 in hydrophone 10, but is mounted in a somewhat different manner. In pinger 70, the potting compound completely covers transducer 52' and fills the portion of body 14' containing the transducer. Mounted in such a manner, the transducer has an omnidirectional radiation pattern.

In using the guidance apparatus of the invention, the pinger is secured by a diver to an object he wishes to relocate later, or is moored in an area to which he intends to return. For example, it may be attached to the anchor line of a surface craft from which the diver is operating. After the pinger is turned on, it generates repetitive bursts of ultrasonic energy which radiate outwardly in all directions. The pinger of the invention is constructed to generate such bursts at two different repetition rates, a high rate of about 2–3 bursts per second for normal usage, and a low rate of about 1 burst per 4–5 seconds for long term operation, i.e., several days at a time. As will be understood, power consumption in the pinger, and thus battery life, is approximately proportional to the repetition rate. The desired operating mode, i.e., high or low pulse rate, is selected by rotating the pinger's collar to the appropriate detent position in a manner analagous to the previously described selection of high or low sensitivity modes in the hydrophone.

The hydrophone is carried by the diver and used to guide him to the pinger's location. It has an essentially unidirectional response characteristic with maximum sensitivity extending in a forward direction from end 14b along the body's longitudinal axis. Thus, when forward end of the hydrophone body is pointed in the direction of a pinger, water-transmitted acoustical energy impinging end wall 16 is mechanically coupled to the forward end of transducer 52. The transducer converts the ultrasonic acoustical signal to an electrical signal having an identical frequency and repetition rate. After being amplified, the electrical signal is "detected"by the low pass filter which removes the ultrasonic frequency component of the signal. The output, a square wave (on-off) signal having the same repetition rate as the received signal is used to turn LED 60 on and off, with the thus-produced light signals being displayed by lens 26 for viewing by the diver.

It is, of course, desirable that the hydrophone have a relatively high sensitivity to enable detection of the pinger signal at extended distances underwater. However, when the pinger is nearby, an overly sensitive hydrophone will respond to off-axis signals, making it difficult to determine the true bearing of the pinger relative to the diver's location. For this reason, hydrophone 10 is provided with both high and low sensitivity modes, which can be selected by the diver merely by turning collar 36. The provision of both high and low sensitivity modes in the hydrophone also allows the diver to roughly appraise his distance from the pinger by determining if pinger signals can be detected in both modes, or only at high sensitivity.

Figure 7:
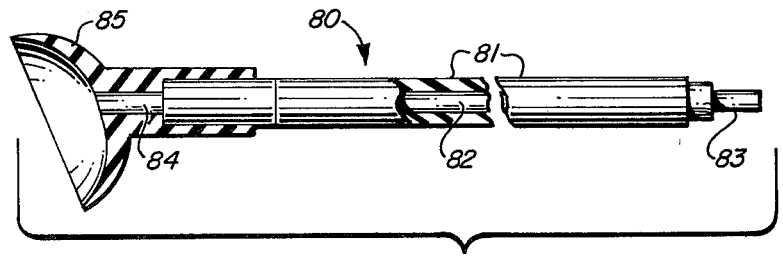
FIG. 7 is a side view, partly in section, of a light pipe assembly for use with a hydrophone.

According to an alternative embodiment of hydrophone 10, the unit is provided with an elongate flexible light pipe in place of lens 32. A suitable light pipe assembly is indicated at 80 in FIG. 7. The light pipe includes a length of flexible tubing 81, suitably neoprene, encasing a fiber optic core 82. Light pipe 80 is terminated at one end, the right end in the figure, by a solid, transparent plastic plug 83 configured and sized to fit bore 33 in hydrophone housing 12. Plug 83 is suitably secured in watertight relation in bore 33, taking the place of lens 32. The opposite end of the light pipe is terminated in a solid transparent plastic rod 84. Light signals produced by LED are transmitted along core 82 and are viewable at the end of rod 84. As shown in the figure, the "viewing" end of light pipe 80 preferably is provided with a light shield/suction cup 85 for fastening to a diver's face mask and placing the end of rod 84 within his field of vision.

The present invention thus provides an underwater diver guidance system amply fulfilling the various objectives stated earlier. The described units include a number of advantages over prior art units. For example, the response directionality of hydrophone 10 is based on the principle of polar focusing by transducer 52, and no shielding is needed to prevent off-axis response. In addition, the switching mechanism embodied in both the hydrophone and pinger permits them to be turned on or off, and different operating modes established, without affecting the water tightness of their housings. Since switching is based entirely on magnetic coupling through the walls of the housing, there is no possibility of wear affecting the sealing of the units after long term use.

While a preferred embodiment of the invention has been described, and certain modifications suggested, it will be appreciated that various other modifications and changes may be made without departing from the spirit of the invention.

What is claimed and desired to secure by letters patent is:

1. Self-contained underwater guidance apparatus, comprising, in combination
   a water-tight, plastic housing including an elongate, tubular body having an open end and a closed end, and removable closure means for said body comprising a cap covering said open end and means forming a water-tight seal between said body and said cap,
   transducer means secured within said housing adjacent the closed end of said body for interconverting acoustical energy and electrical energy,
   electrical circuit means within said housing operatively connected to said transducer means, said circuit means including a magnetic field-actuatable switch,
   a battery operatively connected to said switch for powering said circuit means,
   a collar mounted on the exterior of said body and shiftable relative thereto, and
   a magnet carried by said collar and shiftable therewith between first and second positions for the magnet, said magnet in one of its positions being sufficiently close to said switch for its field to actuate the switch, and in the other of its positions being spaced a sufficient distance from said switch to preclude such actuation.

2. The apparatus of claim 1, wherein said body includes a cylindrical portion and said collar is an annular member received on said body overlying said portion, and rotatable relative thereto.

3. The apparatus of claim 1, further comprising another magnetic field-actuatable switch in said circuit means, connected for changing an operating mode of said circuit means upon its actuation, said magnet being shiftable with said collar to an additional, third position wherein the magnet is sufficiently close to said other switch for its field to actuate the same.

4. The apparatus of claim 1, further comprising cooperating detent means on said collar and body for releasably holding said collar in a selected one of said first and second positions.

5. The apparatus of claim 1, further comprising cooperating stop means on said body and collar for limiting shifting of the collar relative to the body, with said magnet being at its said one position upon the limiting by said stop means of such shifting in one direction, and at its said other position upon the limiting of such shifting in the opposite direction.

6. The apparatus of claim 5, wherein said stop means comprises a pair of shoulders on said collar, each configured for abutting engagement with a different one of a pair of surfaces projecting outwardly from said body, one shoulder engaging one of said surfaces upon shifting of said collar in one direction to said one position, and the other shoulder engaging the other of said surfaces upon shifting of the collar in the opposite direction to said other position.

7. The apparatus of claim 1, wherein said apparatus comprises a hydrophone and, accordingly, said transducer means comprises means for converting acoustical energy into a corresponding electrical signal, said electrical circuit means includes amplifier means connected to said transducer means for amplifying electrical signals therefrom and light-emitting means connected to said amplifier for producing light signals indicative of the reception of acoustical energy by said transducer means, and said housing includes means for displaying such light signals to a diver.

8. The apparatus of claim 7, wherein said displaying means comprises means defining an aperture in said body at a location adjacent said light emitting means therein, and lens means received in watertight relation in said aperture.

9. The apparatus of claim 8, wherein said lens means comprises an elongate, flexible light pipe having an end thereof received in said aperture.

10. In an underwater diver guidance system including means for generating omnidirectional ultrasonic signals, self-contained directional receiving apparatus for guiding a diver toward the source of said signals, comprising
    a watertight housing including an elongate, cylindrical body open at one end, and removable closure means for said body comprising a cap covering said open end and means forming a watertight seal between said body and said cap,
    unidirectionally responsive transducer means secured within said housing for converting ultrasonic acoustical energy into corresponding electrical signals,
    electrical circuit means within said housing, including amplifier means connected to said transducer means for amplifying electrical signals therefrom, means operatively connected to said amplifier means for producing diver-perceptible signals corresponding to said electrical signals and indicative of the reception of acoustical energy by said transducer means, and magnetic field-actuatable switch means for energizing and de-energizing said circuit means,
    power source means connected to said switch for powering said circuit means,
    an annular collar mounted on the exterior of said body, and rotatable relative thereto,
    a magnet carried by said collar and rotatable therewith between first and second positions for the magnet, said magnet in one of its positions being sufficiently close to said switch for its magnetic field to actuate the switch, and in the other of its positions being spaced a sufficient distance from said switch to preclude such actuation, and
    cooperating stop means on said body and collar for limiting rotation of the collar relative to the body, limiting of rotation in one direction being effected at said one position for the magnet, and limiting of the rotation in the other direction being effected at said other position for the magnet.

11. The receiving apparatus of claim 10, wherein said means for producing diver-perceptible signals comprises light-emitting means for producing light signals, and said housing includes means for displaying such light signals for viewing by a diver, comprising means defining an aperture in said body at a location adjacent said light-emitting therein, and lens means sealed in watertight relation in said aperture.

12. The receiving apparatus of claim 11, wherein said lens means comprises an elongate, flexible light pipe having one end thereof received in said aperture.

13. The receiving apparatus of claim 10, further comprising a second magnetic field-actuatable switch in said circuit means, connected for modifying an operating mode of said circuit means upon its actuation, and wherein rotation of said collar carries said magnet to an additional, third position intermediate said first and second positions wherein the magnet is sufficiently close to said second switch for its field to actuate the same.

14. The receiving apparatus of claim 13, wherein said body and collar include cooperating detent means for releasably holding said collar in a selected one of said first, second, and third positions.

15. Self-contained underwater guidance apparatus, comprising in combination
- a watertight, plastic housing including an elongate, cylindrical body open at one end,
- removable closure means for said body comprising a cap engaging said body and covering said open end thereof, and means forming a watertight seal between said body and said cap,
- transducer means secured within said body for interconverting ultrasonic acoustical energy and electrical energy,
- electrical circuit means, including a magnetic field-actuatable switch, disposed within said housing and operatively connected to said transducer means,
- a battery operatively connected to said switch for powering said circuit means,
- an annular collar mounted on the exterior of said body for rotation relative thereto and encircling the region thereof containing said switch,
- a magnet carried by said collar and rotatable therewith between first and second positions for the magnet, said magnet in one of its positions being sufficiently close to said switch for its magnetic field to actuate the same, and in the other of its positions being spaced a sufficient distance from said switch to preclude such actuation,
- cooperating stop means on said body and collar for limiting rotation of the collar relative to the body, said stop means comprising a pair of shoulders on said collar, each configured for abutting engagement with a different one of a pair of surfaces projecting outwardly from said body, one shoulder engaging one of said surfaces upon rotation of said collar in one direction to limit said positions for said magnet, and the other shoulder engaging the other of said surfaces upon rotation of said collar in the opposite direction to the other of said positions for the magnet, and
- cooperating detent means on said collar and body for releasably holding said collar in a selected one of said first and second positions.

* * * * *

UNITED STATES PATENT AND TRADEMARK OFFICE
CERTIFICATE OF CORRECTION

PATENT NO. : 3,986,161
DATED : October 12, 1976
INVENTOR(S) : John A. MacKellar

It is certified that error appears in the above-identified patent and that said Letters Patent are hereby corrected as shown below:

Column 8, line 60, insert --means-- after light-emitting

Signed and Sealed this

Twenty-second Day of March 1977

[SEAL]

Attest:

RUTH C. MASON
*Attesting Officer*

C. MARSHALL DANN
*Commissioner of Patents and Trademarks*